United States Patent
Lee et al.

(10) Patent No.: US 7,751,940 B2
(45) Date of Patent: Jul. 6, 2010

(54) ROBOT CLEANER AND CONTROL METHOD THEREOF

(75) Inventors: Ju-sang Lee, Gwangju (KR); Sam-jong Jeung, Gwangju (KR); Jeong-gon Song, Gwangju (KR); Myeong-ho Kim, Gwangju (KR); Jang-youn Ko, Gwangju (KR); Kyoung-woung Kim, Gwangju (KR); Hak-bong Lee, Jeollanam-do (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 301 days.

(21) Appl. No.: 11/785,626

(22) Filed: Apr. 19, 2007

(65) Prior Publication Data

US 2008/0125907 A1    May 29, 2008

(30) Foreign Application Priority Data

Nov. 28, 2006    (KR)    ............ 10-2006-0118416

(51) Int. Cl.
*A47L 11/24* (2006.01)
*B60T 7/22* (2006.01)
(52) U.S. Cl. .................. 700/255; 700/250; 701/23; 318/568.24
(58) Field of Classification Search .............. 700/245, 700/250, 258, 255; 701/23, 25; 318/12, 318/24; 714/25, E11.021, E11.022
See application file for complete search history.

(56) References Cited

U.S. PATENT DOCUMENTS

| | | | | |
|---|---|---|---|---|
| 6,809,490 | B2 * | 10/2004 | Jones et al. | 318/568.12 |
| 2004/0186623 | A1 * | 9/2004 | Dooley et al. | 700/245 |
| 2007/0016328 | A1 * | 1/2007 | Ziegler et al. | 700/245 |
| 2007/0198159 | A1 * | 8/2007 | Durkos et al. | 701/50 |

FOREIGN PATENT DOCUMENTS

| | | |
|---|---|---|
| GB | 2 406 041 | 3/2005 |
| JP | 64002618 | 1/1989 |
| JP | 02-249518 | 10/1990 |
| JP | 04-316415 | 11/1992 |
| JP | 09-274518 | 10/1997 |
| JP | 2004-258967 | 9/2004 |

* cited by examiner

*Primary Examiner*—Thomas G Black
*Assistant Examiner*—Peter D Nolan
(74) *Attorney, Agent, or Firm*—Blank Rome LLP

(57) ABSTRACT

A control method for a robot cleaner that includes: driving a driving part to move the robot cleaner by a predetermined distance in an opposite direction to a proceeding direction thereof when a bumper sensor detects a collision with an obstacle, measuring the number of times in which the robot cleaner repeats moving in real-time, comparing the measured number with a predetermined reference number, and stopping the robot cleaner when the measured number is more than the reference number. With this method, the robot cleaner can diagnose a breakdown of the bumper sensor to stop the cleaner, and inform a user of the breakdown.

11 Claims, 3 Drawing Sheets

ROBOT CLEANER AND CONTROL METHOD THEREOF

CROSS-REFERENCE TO RELATED APPLICATIONS

This application claims the benefit of Korean Patent Application No. 10-2006-0118416, filed Nov. 28, 2006, in the Korean Intellectual Property Office, the entire disclosure of which is incorporated herein by reference.

This application may be related to commonly owned co-pending U.S. patent application Ser. Nos. 10/887,930 and 11/288,090 filed on Jul. 12, 2004 and Nov. 29, 2005, respectfully, the subject matter of each of which is herein incorporated by reference.

FIELD OF THE INVENTION

The present invention relates generally to a robot cleaner and a control method thereof.

BACKGROUND OF THE INVENTION

In general, a robot cleaner draws in foreign substances, such as dust, dirt, or the like, while traveling around by itself without a manipulation of user within an area to be cleaned, and thus automatically cleans that area.

The robot cleaner as described above has various kinds of sensors, particularly, a bumper sensor, mounted therein. The bumper sensor is installed in a front bumper of the robot cleaner to detect a collision with an obstacle in front of the robot cleaner. If the robot cleaner collides with an obstacle, the bumper sensor operates thus triggering the robot cleaner to back away by a predetermined distance in an opposite direction to its original travel direction, thereby avoiding the obstacle.

However, if the bumper sensor is not operating properly, the robot cleaner fails to avoid the obstacle, and instead continuously collides with it. Also, if after the robot cleaner collides with the obstacle, the bumper sensor is not reset or fixed, but instead is maintained in a detected state, that is, an ON state, the robot cleaner senses continuous colliding with the obstacle, and thus repeats backing up to avoid the collision with the obstacle. That is, if the bumper sensor continuously operates without being reset or fixed, a problem occurs, in that the robot cleaner repeatedly backs up until the electric power supply is cut thereto.

SUMMARY OF THE INVENTION A1

An aspect of the present invention is to solve at least the above problems and/or disadvantages and to provide at least the advantages described below. Accordingly, an aspect of the present invention is to provide a robot cleaner and a control method thereof, capable of detecting a breakdown to a bumper sensor and stopping the driving thereof and informing a user of the breakdown diagnosis to the bumper sensor.

In order to achieve the above-described aspects of the present invention, there is provided a robot cleaner including a bumper sensor to detect a collision with an obstacle, a driving part for moving, the robot cleaner, and a controller to drive the driving part to move the robot cleaner by a predetermined distance in an opposite direction to the proceeding travel direction when the bumper sensor detects the collision with the obstacle, and to measure the number of time in which the robot cleaner repeats moving in real-time in the opposite direction and compare the measured number with a predetermined reference number wherein the controller stops the driving part when the measured number is more than the reference number.

The controller may determine that the bumper sensor is broken when the measured number is more than the reference number.

According to another aspect of the present invention, the robot cleaner may further include at least one of a sound unit and a display unit in order to inform a user of the breakdown diagnosis to the bumper sensor.

According to yet another aspect of the present invention, there is provided a control method of a robot cleaner, including the steps of: driving a driving part to move the robot cleaner by a predetermined distance in an opposite direction to the proceeding travel direction thereof when a bumper sensor detects a collision with an obstacle, measuring the number of time in which the robot cleaner repeats moving in real-time in the opposite direction, comparing the measured number with a predetermined reference number, and stopping the driving part when the measured number is more than the reference number.

The control method may further include: informing a user of the breakdown diagnosis to the bumper sensor after stopping the driving part.

BRIEF DESCRIPTION OF THE DRAWING FIGURES

The above aspect and other features of the present invention will become more apparent by describing in detail exemplary embodiments thereof with reference to the attached drawing figures, wherein.

Throughout the drawings, the same reference numerals will be understood to refer to the same elements, features, and structures.

DETAILED DESCRIPTION OF THE EXEMPLARY EMBODIMENTS

Hereinafter, a robot cleaner and a control method thereof according to exemplary embodiments of the present invention will be described in detail with reference to the accompanying drawing figures.

Figure 1:
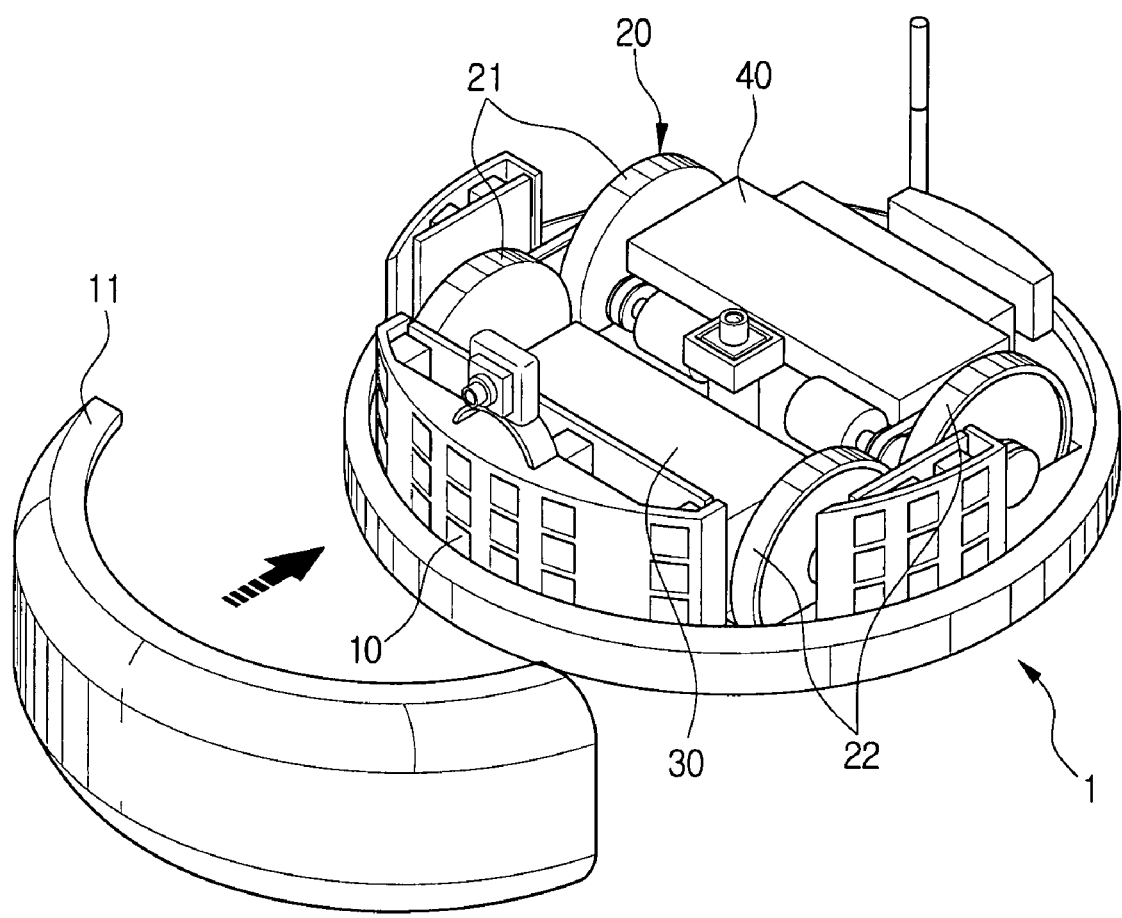
FIG. 1 is an exploded perspective view of a robot cleaner according to an exemplary embodiment of the present invention.
Figure 2:
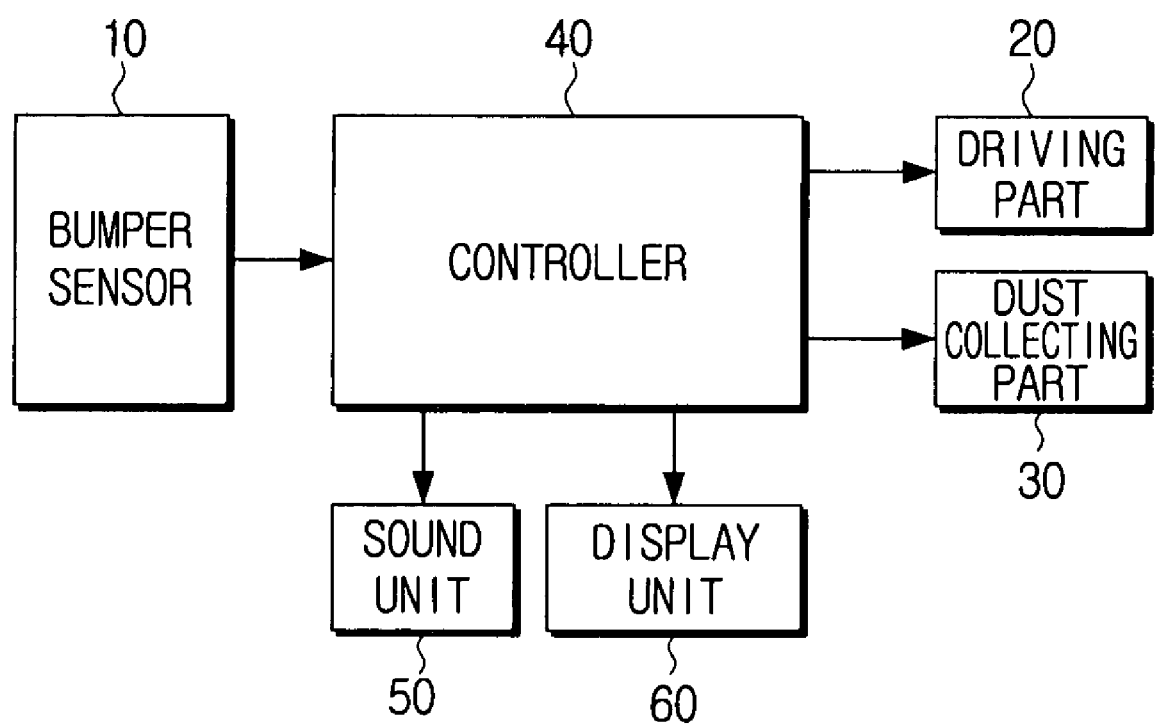
FIG. 2 is a block diagram of a construction of the robot cleaner illustrated in FIG. 1 according to the exemplary embodiment of the present invention.

FIG. 1 is a perspective view of a robot cleaner according to an exemplary embodiment of the present invention, and FIG. 2 is a block diagram exemplifying a construction of the robot cleaner according to the exemplary embodiment of the present invention.

As illustrated in FIGS. 1 and 2, the robot cleaner according to the exemplary embodiment of the present invention is provided with a bumper sensor 10, a driving part 20, a duct collecting part 30, and a controller 40.

The bumper sensor 10 is installed in a front bumper 11 of the robot cleaner, and is connected with the controller 40 to output a detecting signal to the controller 40 after detecting a collision of obstacle to the front of the robot cleaner. Since a construction of the bumper sensor 10 is known in the art, detailed description thereof will be omitted for clarity and conciseness.

The driving part 20 includes a plurality of wheels 21 and 22 installed on both sides of the robot cleaner to move straight or rotate the robot cleaner. The dust collecting part 30 is installed, so that it collects dust or dirt from a surface to be cleaned when the robot cleaner travels along that surface.

The controller 40 drives the driving part 20 to back the robot cleaner up by a predetermined distance in a direction opposite to the proceeding travel direction thereof when the bumper sensor 10 detects collision with an obstacle. Also, the controller 40 measures the number of times which the robot cleaner repeats backing up in real-time. The controller 40 compares that measured total backing number with a predetermined reference number, so as to determine whether the bumper sensor 10 is broken or not operating properly, i.e. when the total backing number is more than the reference number, and thereby stops the driving part 20. The reference number can be set in the controller 40 in advance during fabrication, or set by a direct input of a numerical value through an outer operating button (not illustrated) by a user. Preferably, but not necessarily, the reference number is set at least three times.

According to another exemplary embodiment of the present invention, to inform the user of the breakdown diagnosis regarding the bumper sensor 10, the robot cleaner further includes at least one of a sound unit 50 and a display unit 60, which is connected to the controller 40, as seen in FIG. 2. For example, the sound unit 50 may be a general speaker, and the display unit 60 may be a general liquid crystal display (LCD) monitor.

Figure 3:
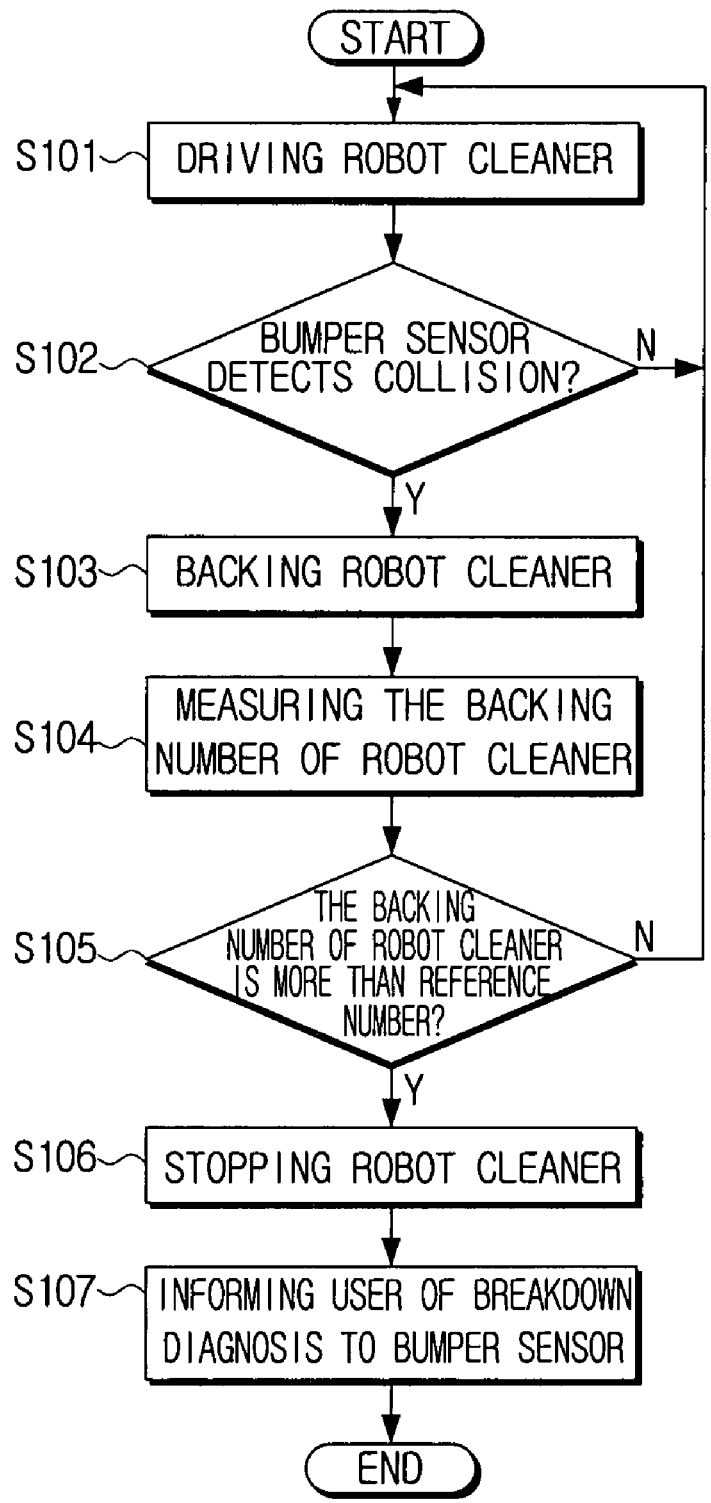
FIG. 3 is a flow chart of a control method of the robot cleaner according to the exemplary embodiment of the present invention.

Hereinafter, a control method of the robot cleaner according to the exemplary embodiments of the present invention, as constructed as described above, will now be described with reference to FIG. 3. As illustrated in FIG. 3, if the robot cleaner collides with an obstacle while traveling (S101), the bumper sensor 10 operates and is turned on. When the bumper sensor 10 detects the collision with the obstacle (S102), the controller 40 drives the driving part 20, so that the robot cleaner backs up by a predetermined distance (S103). If the bumper sensor 10 is still on after the robot cleaner has backed up by the predetermined distance, the controller 40 drives the driving part 20 again to move the robot cleaner back by the predetermined distance. The controller 40 measures the number of times in which the robot cleaner repeats backing in real-time (S104), and compares the measured total backing number with a predetermined reference number. If the total backing number is more than the reference number (S105), the controller 40 determines that the bumper sensor 10 is broken, and thus stops the robot cleaner (S106). And the controller 40 informs the user of the breakdown diagnosis to the bumper sensor 10 through the sound unit 50 or/and the display unit 60 (S107).

As apparent from the foregoing description, according to the exemplary embodiments of the present invention, the robot cleaner and the control method thereof can make the diagnosis of the breakdown to the bumper sensor by itself to stop the driving thereof, and inform the user of the breakdown diagnosis to the bumper sensor.

Although representative exemplary embodiments of the present invention have been shown and described in order to exemplify the principle of the present invention, the present invention is not limited to the specific exemplary embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A robot cleaner comprising:
   a bumper sensor to detect a collision with an obstacle;
   a driving part for moving the robot cleaner in a proceeding travel direction; and
   a controller that drives the driving part to move the robot cleaner by a predetermined distance in an opposite direction to the proceeding travel direction thereof when the bumper sensor detects the collision with the obstacle, that determines whether the robot cleaner is moving in the opposite direction by the predetermined distance, that determines whether the bumper sensor is off or on after the robot cleaner moved in the opposite direction by the predetermined distance, that after determining that the bumper sensor is on after the robot cleaner moved in the opposite direction by the predetermined distance, repeats driving the driving part again to move the robot cleaner in the opposite direction by the predetermined distance to a current position of the robot cleaner and determining whether the bumper sensor is off, and that measures the number of times in which the robot cleaner repeats moving in the opposite direction in real-time and compares the measured number with a predetermined reference number, wherein the controller determines that the bumper sensor is broken and stops the driving part when the measured number is more than the reference number.

2. The robot cleaner of claim 1, wherein the controller is connected to a sound unit and a display unit, and the controller activates at least one of the sound unit and display unit when the measured number is more than the reference number.

3. The robot cleaner of claim 2, wherein the sound unit is a speaker and the display unit is a monitor.

4. The robot cleaner of claim 2, further comprising a dust collecting part disposed in a body of the robot cleaner.

5. The robot cleaner of claim 4, wherein the driving part includes at least two wheels.

6. The robot cleaner of claim 1, wherein the reference number comprises at least three times.

7. A method for controlling a robot cleaner, comprising:
   driving a driving part of the robot cleaner in a proceeding travel direction along a surface to be cleaned;
   driving the driving part to move the robot cleaner by a predetermined distance in an opposite direction to the proceeding travel direction thereof when a bumper sensor of the robot cleaner detects a collision with an obstacle;
   determining whether the robot cleaner moves in the opposite direction by the predetermined distance;
   determining whether the bumper sensor is off or on after the robot cleaner moved in the opposite direction by the predetermined distance;
   driving the driving part again to move the robot cleaner in the opposite direction by the predetermined distance after determining that the bumper sensor is on after the robot cleaner moved in the opposite direction by the predetermined distance, and measuring the number of times the robot cleaner repeats moving in real-time in the opposite direction away from the obstacle;

comparing the measured number with a predetermined reference number; and determining that the bumper sensor is broken and stopping the driving part when the measured number is greater than the reference number.

8. The method of claim 7, further comprising:

informing a user of a breakdown diagnosis to the bumper sensor after stopping the driving part.

9. The method of claim 8, further comprising the step of activating a sound unit or a display unit to inform the user of the breakdown diagnosis.

10. The method of claim 7, further comprising the step of directly inputting the reference number into a controller.

11. The method of claim 10, wherein the reference number comprises at least three times.

* * * * *